United States Patent [19]

Kawamura

[11] Patent Number: 5,381,684
[45] Date of Patent: Jan. 17, 1995

[54] DETACHABLE APPARATUS FOR AUTOMOTIVE AUDIO EQUIPMENT

[75] Inventor: Masateru Kawamura, Tokyo, Japan

[73] Assignee: Sony Corporation, Tokyo, Japan

[21] Appl. No.: 21,677

[22] Filed: Feb. 24, 1993

[30] Foreign Application Priority Data

Feb. 27, 1992 [JP] Japan .................. 4-076374
Mar. 9, 1992 [JP] Japan .................. 4-086033

[51] Int. Cl.6 .................. E05B 73/00; H04B 1/00
[52] U.S. Cl. .................. 70/58; 174/51;
248/27.3; 248/544; 312/7.1; 361/753; 361/814;
455/345
[58] Field of Search .................. 70/58, DIG. 57;
248/27.3, 544, 553; 455/345, 346, 347, 348, 349;
312/7.1, 204; 200/43.22; 361/814, 753, 627,
212, 220; 174/51, 35 R

[56] References Cited

U.S. PATENT DOCUMENTS

| 1,599,314 | 9/1926 | Best | 70/DIG. 57 X |
| 3,613,177 | 10/1971 | Davis | 248/27.3 X |
| 4,326,395 | 4/1982 | DeRosa | 70/DIG. 57 X |
| 4,758,817 | 7/1988 | Akiyama | 455/348 X |
| 4,784,361 | 11/1988 | Kobayashi et al. | 248/27.3 X |
| 4,829,595 | 5/1989 | Kobayashi et al. | 455/348 X |
| 4,848,716 | 7/1989 | Nakamoto | 248/27.3 X |
| 5,185,804 | 2/1993 | Watanebe | 455/345 X |
| 5,216,904 | 6/1993 | Isaki | 70/58 |

FOREIGN PATENT DOCUMENTS

| B168374 | 11/1950 | Austria . | |
| 0332793 | 9/1989 | European Pat. Off. . | |
| 3926557 | 2/1991 | Germany | 455/346 |
| 3295297 | 12/1991 | Japan | 174/51 |
| 2212334 | 7/1989 | United Kingdom . | |

Primary Examiner—Lloyd A. Gall
Attorney, Agent, or Firm—Jay H. Maioli

[57] ABSTRACT

Automotive equipment such as a car stereo includes a lock member having an engagement portion. The engagement portion of the lock member is engaged with an engaged portion provided in an accommodation portion in which the automotive equipment body is accommodated to thereby lock the automotive equipment body. The automotive equipment body is released from being locked by a lock releasing operation executed when a lock releasing key is inserted into a lock releasing aperture formed on a front surface panel frame provided in the automotive equipment body.

4 Claims, 8 Drawing Sheets

DETACHABLE APPARATUS FOR AUTOMOTIVE AUDIO EQUIPMENT

BACKGROUND OF THE INVENTION

1. Field of the Invention

The present invention relates to a detachable apparatus for automotive equipment in which automotive equipment, e.g., automotive audio equipment such as a car stereo having a detachable front panel including electronic parts such as a liquid crystal display (hereinafter referred to as an LCD) on a front surface of a body can be detachably attached to a dashboard of a car.

2. Description of the Prior Art

FIG. 1 of the accompanying drawings shows a conventional detachable apparatus for attaching this kind of automotive equipment to a dashboard of a vehicle.

Referring to FIG. 1, there is shown a car stereo body 101 which is accommodated in and secured to an attachment frame 102 whose front wall is opened. This attachment frame 102 is supported by a concave portion of a dashboard (not shown). Base end portions of resilient lock plates 103, 103 are secured to left and right side walls of the car stereo body 101 by means of two pairs of screws 104, 104. Two nail portions 105, 105 which are outwardly bent are formed on the free ends of these lock plates 103, 103, respectively. Reference numeral 106 depicts a detachable front panel that is attached to the front wall of the car stereo body 101.

When the conventional car stereo body 101 thus arranged is attached to the attachment frame 102, wires (not shown) drawn out from the attachment frame 102 mounted on the concave portion of the dashboard (not shown) are connected to the car stereo body 101. Then, the user fixes the lock plates 103, 103, prepared as accessories of the car stereo body 101, to the side walls of the car stereo body 101 by screws 104, 104 and the car stereo body 101 is inserted into the attachment frame 102. At that time, the lock plates 103, 103 that are attached to the left and right side walls of the car stereo body 101 are flexed and the nail portions 105, 105 are slid while being urged against the inner wall surface of the attachment frame 102. Then, when the nail portions 105, 105 of the lock plates 103 reach engagement apertures 102a, 102a formed on the side walls of the attachment frame 102, the lock plates 103 are resiliently restored so that the nail portions 105, 105 are engaged with the engagement apertures 102a, 102a, thus the attachment of the car stereo body 101 to the attachment frame 102 being completed.

When the car stereo body 101 supported by the attachment frame 102 is detached, the front panel 106 is detached from the front wall of the car stereo body 101 and the lock plate 103 is inwardly flexed by some suitable means such as a tool or the like inserted from a left or right spacing between the car stereo body 101 and the attachment frame 102 to thereby release the nail portion 105 from the engagement aperture 102a. Under this condition, the car stereo body 101 can be taken out and detached from the attachment frame 102.

Further, an earth or ground connection for grounding a static electricity from a human body and preventing the accumulation of an electrical charge on an LCD (liquid crystal display) of the car stereo having a detachable front panel and the peripheral portions is carried out as follows. That is, an LCD support member that supports the LCD is introduced into a control base plate on which electronic parts such as a switch or the like are mounted. Such LCD support member is extended to a connector of the front panel through a pattern circuit of the control base plate so that the LCD support member is grounded through the car stereo body at its connector to which the connector of the front panel is connected to the chassis of the car stereo body.

However, in the conventional detachable apparatus for automotive equipment thus arranged, there are required two lock plates 103, 103 that are attached to the left and right side walls of the car stereo body 101. Also, there are required the two pairs of screws 104, 104 that are used to secure the lock plates 103, 103 to the left and right side walls of the car stereo body 101. Therefore, the number of accessory assembly parts is unavoidably increased and the number of processes required when the user attaches the car stereo body 101 to the attachment frame 102 is also increased. Accordingly, it takes plenty of time for the user to attach the car stereo body 101 to the attachment frame 102.

OBJECTS AND SUMMARY OF THE INVENTION

Therefore, it is an object of the present invention to provide an improved detachable apparatus for automotive equipment in which the aforesaid shortcomings and disadvantages encountered with the prior art can be eliminated.

More specifically, it is an object of the present invention to provide a detachable apparatus for automotive equipment in which the number of accessory assembly parts can be reduced considerably.

It is another object of the present invention to provide a detachable apparatus for automotive equipment in which a car stereo body can be attached to a car dashboard with ease and reliably.

It is a further object of the present invention to provide a detachable apparatus for automotive equipment in which the number of attaching processes and the time required for such attachment work can be reduced considerably.

It is a still further object of the present invention to provide a detachable apparatus for automotive equipment in which automotive equipment can be produced inexpensively.

According to an aspect of the present invention, there is provided a detachable apparatus for automotive equipment which comprises an equipment body having a front surface panel frame, an accommodation portion in which the equipment body is accommodated with a substantially precise positioning, a lock member formed of an operation portion attached to the inside of a frame body of the equipment body, the operation portion being deformable with resiliency and an engagement portion projected to the outside of the frame body and being engaged with an engaged portion formed on an inner wall portion of the accommodation portion, a lock releasing aperture bored through the front surface panel frame of the equipment body in association with the operation portion, and a lock releasing key inserted into the lock releasing aperture, urged against the operation portion and thereby being flexed to disengage the engagement portion from the engaged portion of the accommodation portion.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

The present invention will now be described with reference to the drawings.

Figure 1:
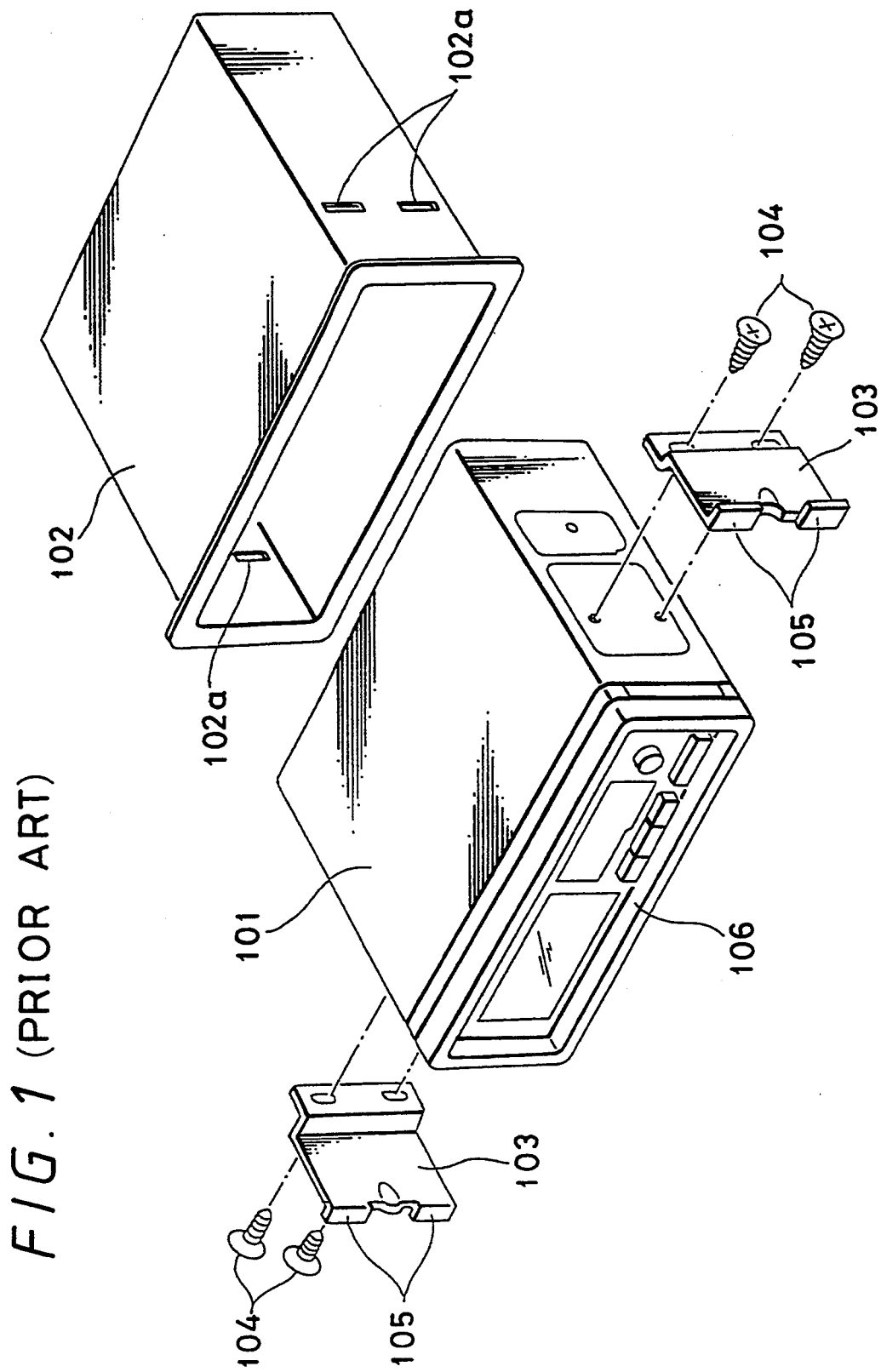
FIG. 1 is an exploded perspective view showing a conventional detachable apparatus for automotive audio equipment.
Figure 2:
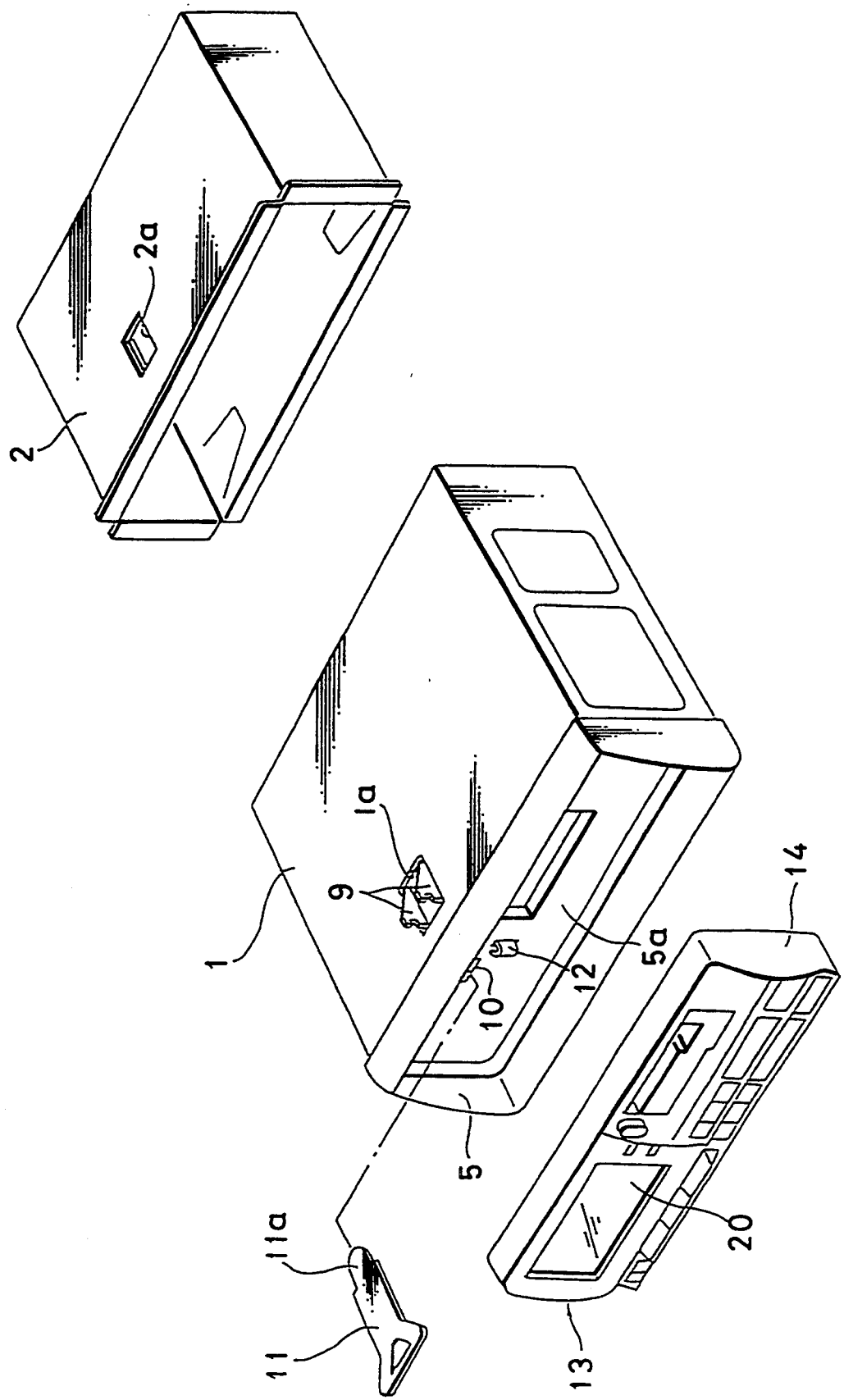
FIG. 2 is an exploded perspective view showing a main portion of a car stereo according to an embodiment of the present invention.
Figure 3:
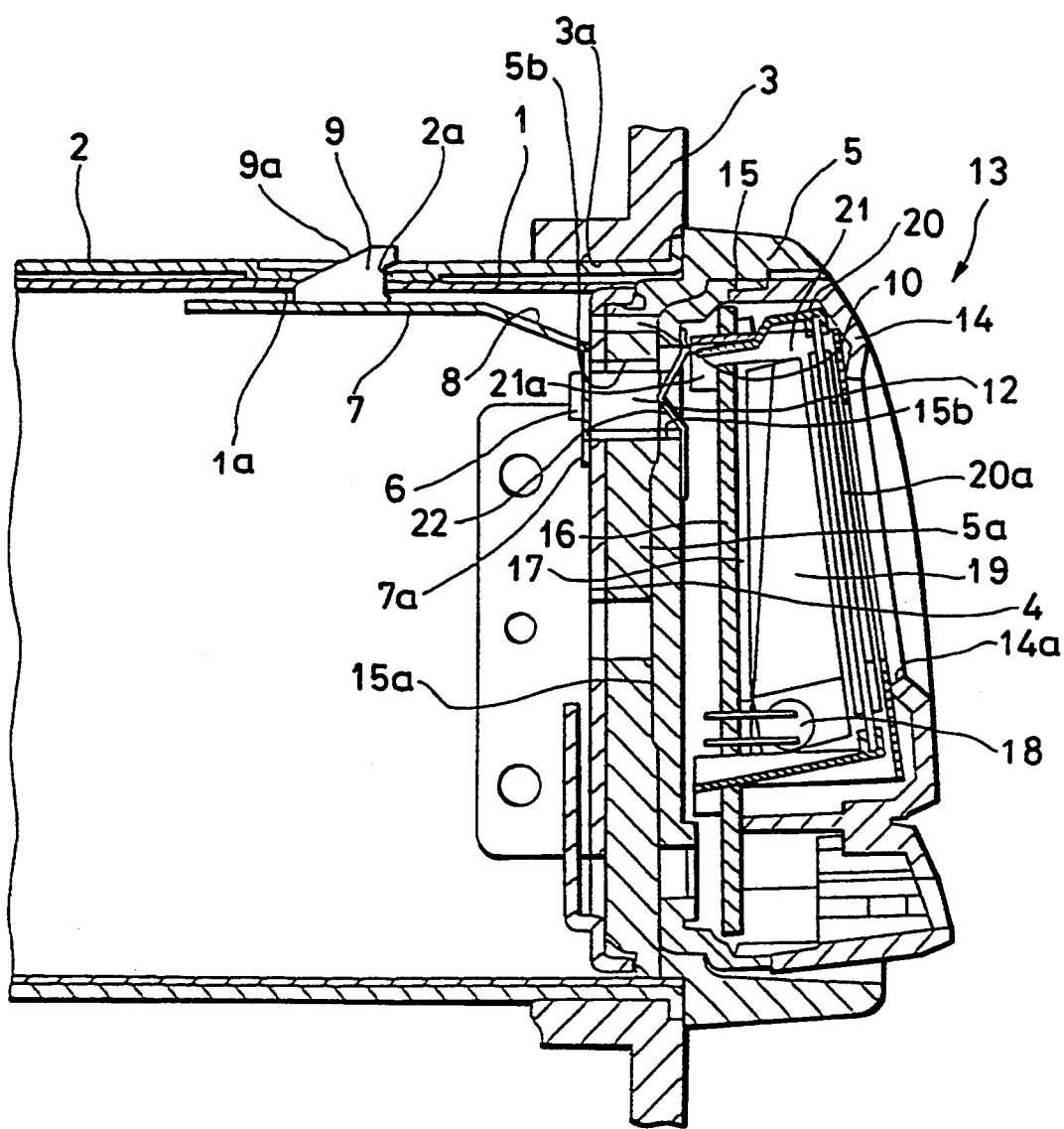
FIG. 3 is a cross-sectional view showing a main portion of the attached state of a car stereo body according to the embodiment of the present invention.
Figure 4:
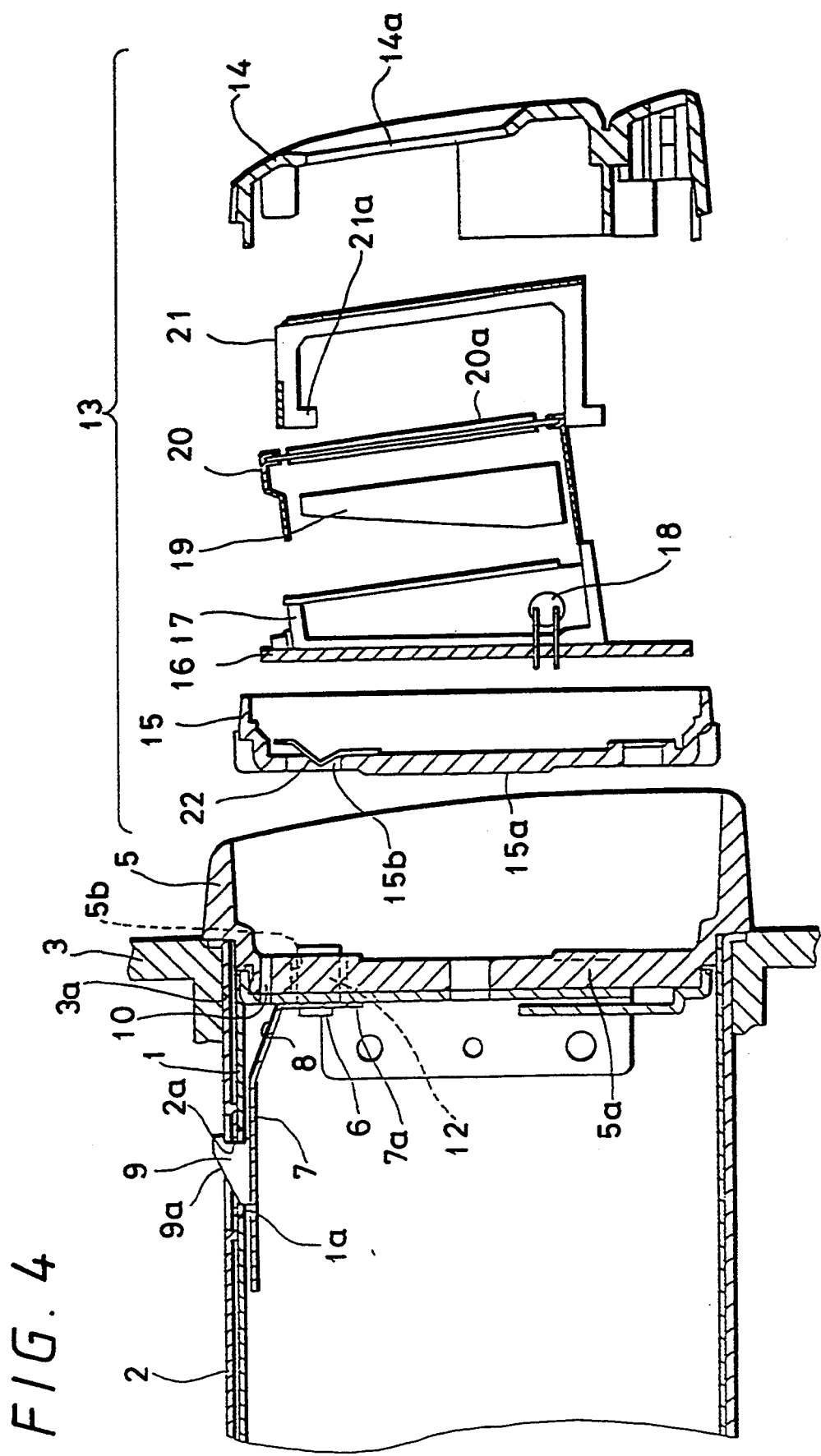
FIG. 4 is a cross-sectional view showing the car stereo body and a front panel in its disassembled state according to the embodiment of the present invention.
Figure 5:
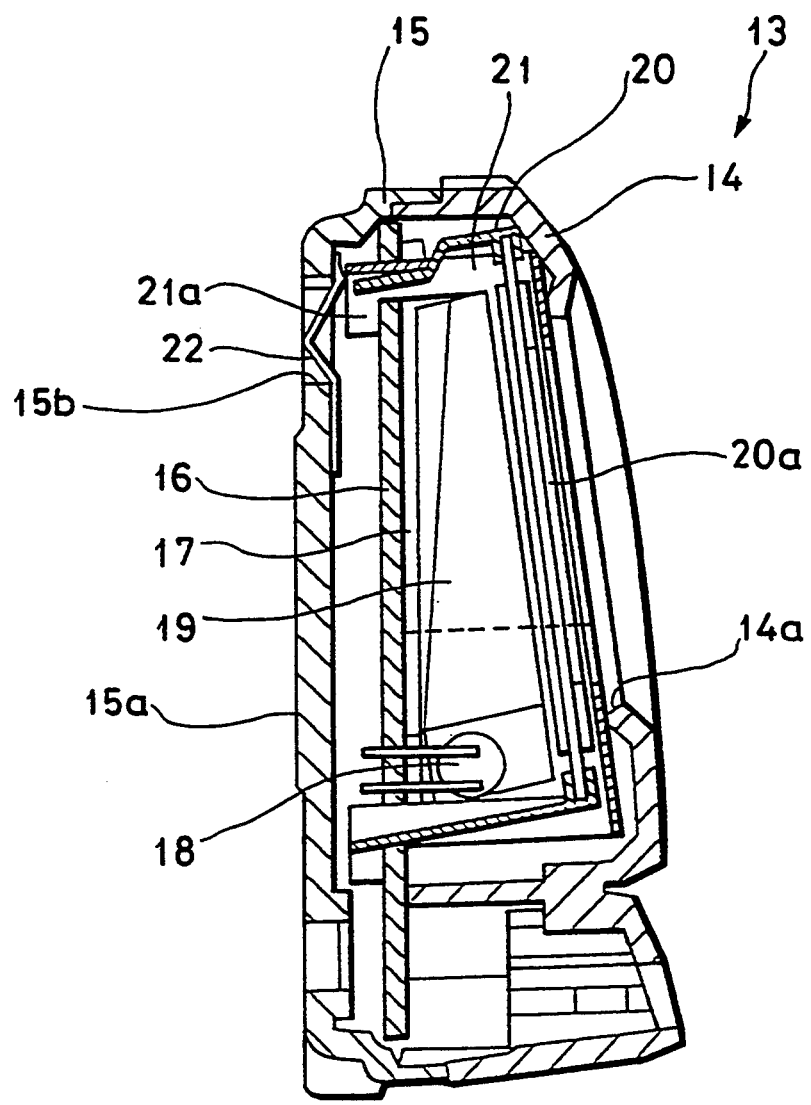
FIG. 5 is a cross-sectional view showing the front panel according to the embodiment of the present invention.
Figure 6:
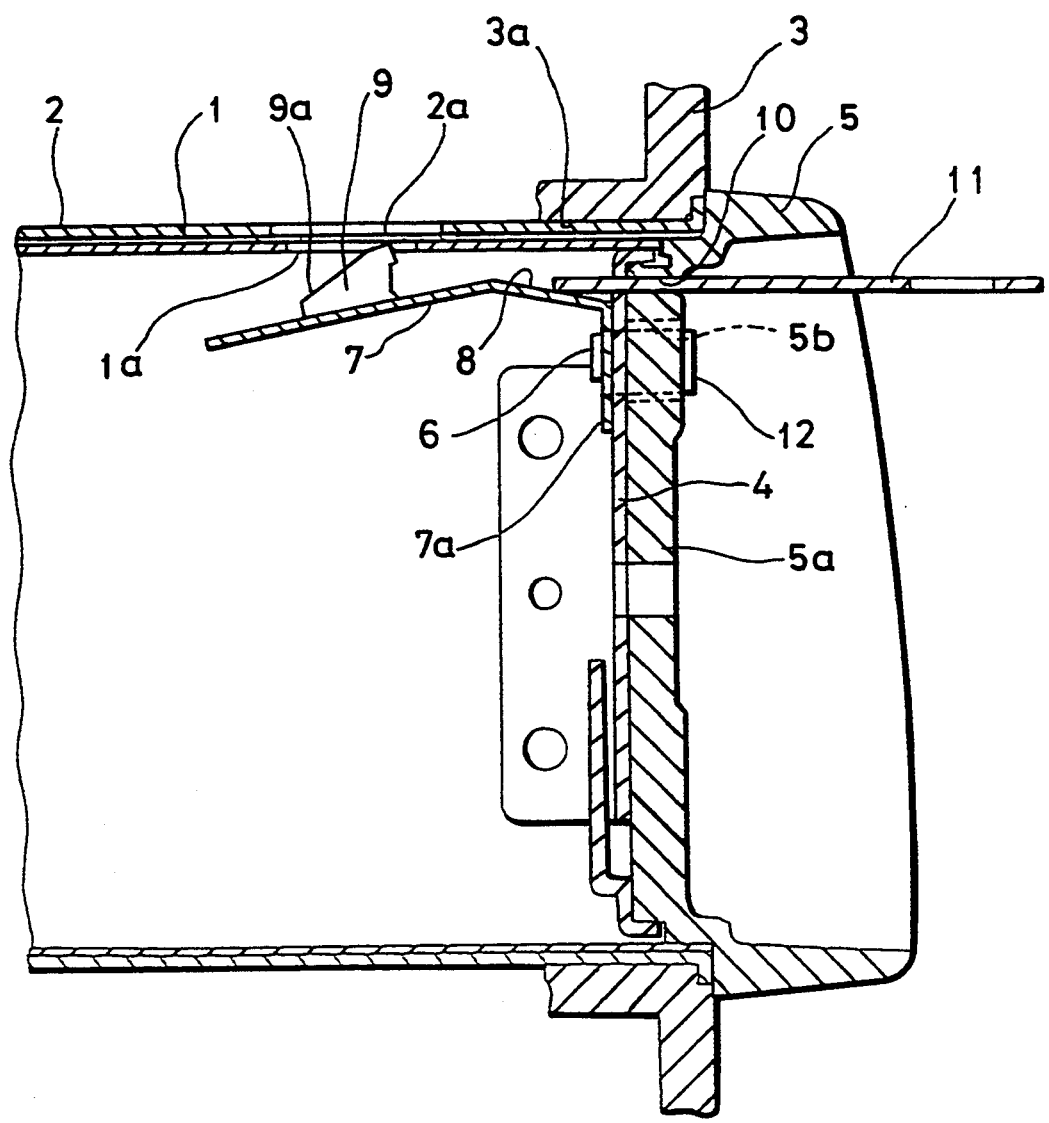
FIG. 6 is a cross-sectional view showing a main portion of the car stereo body during the lock releasing operation according to the embodiment of the present invention.

FIG. 2 is an exploded perspective view showing a main portion of a structure of a detachable apparatus for automotive equipment according to the present invention. In this embodiment, as an automotive equipment, there is utilized a car stereo that has a detachable front panel. FIG. 3 is a cross-sectional view showing the condition that the front panel is attached to the car stereo body. FIG. 4 is a cross-sectional view of the car stereo body and the front panel disassembled. FIG. 5 is a cross-sectional view showing the assembled state of the front panel. FIG. 6 is a cross-sectional view of a main portion of the car stereo body under the condition that the locking state of the car stereo is being released. In this case, equipment and devices incorporated within the car stereo are not shown.

Throughout the figures, reference numeral 1 designates a car stereo body and 2 an accommodation portion in which the car stereo body 1 is accommodated and secured with a substantially precise positioning. The accommodating portion 2 is attached in advance to a concave portion 3a formed on a dashboard 3 of a vehicle before the car stereo body 1 is attached. To the front opening portion of the car stereo body 1, there is secured a chassis 4 serving as a frame body by some suitable means such as screws (not shown) or the like. A front surface panel frame 5 is secured to the chassis 4 by screws (not shown) and the front surface panel frame 5 is attached to the front wall of the car stereo body 1.

Figure 7:
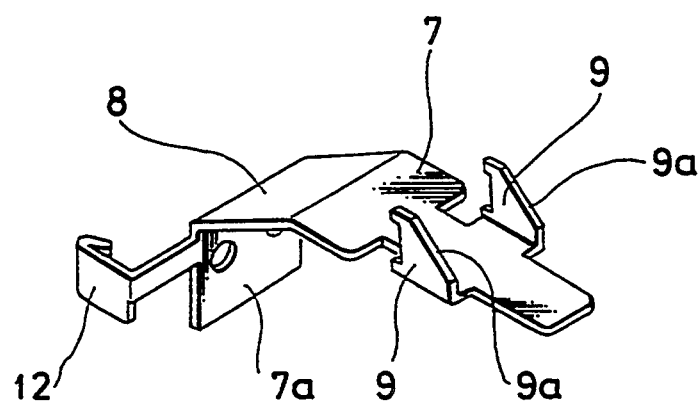
FIG. 7 is a perspective view showing a lock plate according to the embodiment of the present invention.

A lock plate 7 serving as a lock member operation portion is supported at an end attachment portion 7a by a screw 6 on the rear wall of substantially a central portion of the upper portion of the front surface plate 5a of the front surface panel frame 5 so as to extend rearward. The lock plate 7 can be flexibly deformed in the upper and lower direction and an inclined surface 8 is formed on one portion of the lock plate 7. On the free end side of the lock plate 7, there are erected two nail portions 9, 9 which serve as engagement portions from both side edge portions as shown in FIG. 7. Rearwardly inclined surfaces 9a, 9a are formed on the rear portions of both nail portions 9, 9. The inclined nail portions 9a, 9a are projected through an aperture 1a formed through the upper surface plate of the car stereo body 1 and then engaged with an engagement aperture 2a serving as an engaged portion formed on the upper wall surface of the accommodating portion 2. The lock plate 7 has a positioning rotation preventing member 12 of a substantially L-letter configuration in transverse cross section extended on one side. The top portion of the rotation preventing member 12 is inserted into an engagement aperture 5b which is extended through the front surface plate 5a of the front surface panel frame 5 from the chassis 4 to thereby prevent the lock plate 7 from being rotated. The rotation preventing member 12 also serves as an earth or ground terminal of a front panel 13 which will be described later on.

Figure 9:
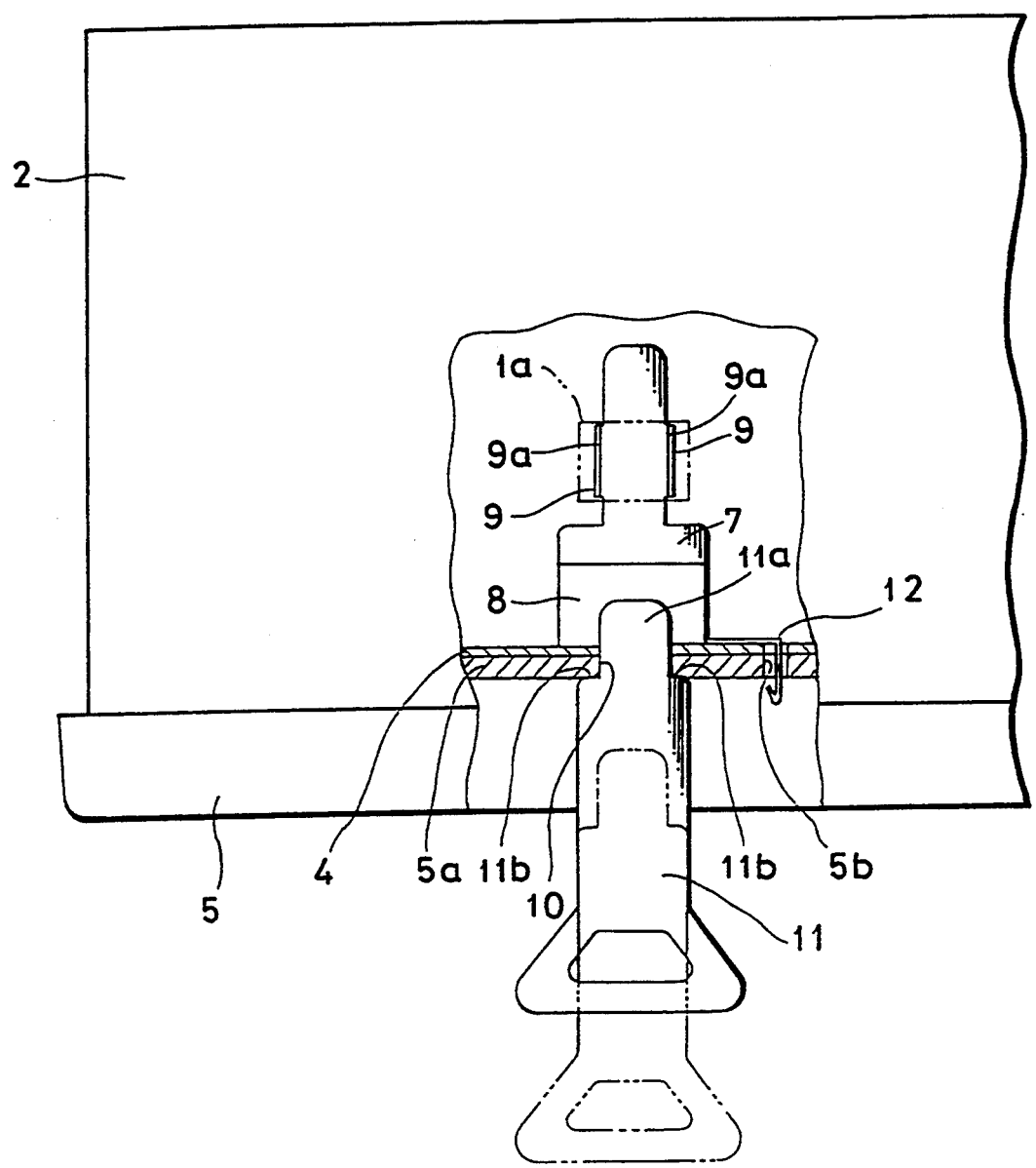
FIG. 9 is plan view showing the lock releasing state of the car stereo body according to the embodiment of the present invention in a fragmentary cross section.

On the upper portion of the front surface plate 5a of the front surface panel frame 5, there is formed a lock releasing aperture 10 at the portion corresponding to the inclined surface 8 of the lock plate 7. A thin top portion 11a of the lock releasing key 11 is inserted into the lock releasing aperture 10, whereby the nail portion 9 of the lock plate 7 can be disengaged from the engagement aperture 2a of the accommodation portion 2. The lock releasing key 11 has a base stepped portion 11b of the top portion 11a that makes contact with the front surface plate 5a of the front surface panel frame 5 to ensure that the lock releasing key 11 cannot be inserted too far, thereby protecting the equipment within the car stereo body 1 from being damaged, as shown in FIG. 9.

A front panel, generally designated by reference numeral 13, can be detachably attached to the front surface panel frame 5. The front panel 13 can be detached by the user in order to deter a burglary of the car stereo body 1. The front panel 13 has a housing formed of a front panel portion 14 and a back panel portion 15. To the back panel portion 15 of the front panel 13, there are assembled a control base plate 16 on which electronic parts such as a switch or the like are mounted, a holder 17, a lamp 18, a light introducing plate 19, an LCD 20 serving as an electronic element and an LCD support member 21 made of a conductive material and having a leg portion 21a serving as a support member of the LCD 20, in that order. On the rear surface plate 15a of the back panel 15, there is attached a resilient earth or ground plate 22 of substantially C-letter configuration. The ground plate 22 is opposed to an opening aperture 15b formed through the rear surface plate 15a of the back panel portion 15.

To the back panel portion 15, there are assembled the control base plate 16, the holder 17, the lamp 18, the light introducing plate 19, the LCD 20 and the LCD support member 21. FIG. 5 shows a cross-sectional view of the front panel 13 in which the back panel portion 15 is secured to the front panel portion 14 by screws (not shown). The front panel 13 thus arranged is brought in surface contact with the front peripheral portion of the LCD 20 by the LCD support member 21 made of a conductive material. A display portion 20a of the LCD 20 is opposed to a display window 14a of the front panel portion 14. The leg portion 21a of the LCD support member 21 is urged against the resilient ground plate 22 attached to the back panel portion 15. Although the ground plate 22 urged against the leg portion 21a of the LCD support member 21 is flexed rearward, the ground plate 22 can be prevented from being projected from the opening aperture 15b toward the outside. The reason for this is that, when the user handles the front panel 13, the user can for safety be prevented from touching the ground plate 22 with the hands and fingers.

FIG. 3 is a cross-sectional view showing the condition that the front panel 13 thus arranged is attached to the front surface panel frame 5 of the car stereo body 1 by means of connectors (not shown). When the front panel 13 is attached to the car stereo body 1, the ground plate 22 opposing the opening aperture 15b of the back panel portion 15 and a contact member 12 projected from a window aperture 5b formed through the front surface plate 5a of the front surface panel frame 5 of the car stereo body 1 can be urged against each other under a spring force. The ground plate 22 and the contact member 12 are urged against each other with a spring-biasing force so that, even when the front panel 13 wobbles relative to the car stereo body 1 because of a vibration of the car or the like, the ground plate 22 can be prevented from being detached from the contact member 12.

How to remove static electricity from the LCD 20 of the car stereo thus arranged will be described below.

When the front panel portion 14 is operated, it is frequently observed that static electricity from a human body is directly in contact with the display surface 20a of the LCD 20. Consequently, the LCD 20 and the peripheral portions are charged by the static electricity. If the charged state of static electricity is left as it is, a malfunction of the LCD 20 occurs as earlier noted. Therefore, according to the present invention, the static electricity on the LCD 20 and the peripheral portions is introduced into the LCD support member 21. Then, the introduced static electricity flows from the leg portion 21a of the LCD 21 to the ground plate 22 urged against the leg portion 21a and grounded to the chassis 4 of the car stereo body 1 through the rotation preventing member 12 of the car stereo body 1 urged against the ground plate 22 by the lock plate 7 molded integrally with the rotation preventing member 12.

According to the above-mentioned arrangement, the car stereo electrification preventing mechanism can be realized by the shortest ground circuit without using the connectors of the front panel 13 and the car stereo body 1 and the pattern circuit of the control base plate 16 on the front panel 13 side. Therefore, a potential difference due to the increase of a resistance value can be avoided and a reliable ground effect which can avoid the malfunction of the LCD 20 can be achieved.

Accordingly, the electrification preventing mechanism of high reliability can be provided in which the number of connector contacts for the ground circuit can be reduced unlike the prior art and a restriction on the design of the pattern circuit of the control base plate 16 can be removed.

A detachable operation of the detachable apparatus for automotive audio equipment thus arranged will be described. Under the attached condition that the car stereo body 1 is accommodated within the accommodation portion 2, as shown in FIG. 3, the nail portion 9 of the lock plate 7 is engaged with and secured to the engagement aperture 2a of the accommodation portion 2. When the car stereo body 1 is ejected from the accommodation portion 2 under this state due to some reasons such as a malfunction or the like, the front panel 13 is disengaged from the front surface panel frame 5. Then, the lock releasing key 11 is horizontally inserted into the lock releasing aperture 10 formed through the front surface plate 5a of the front surface panel frame 5, whereby the inclined surface 8 of the lock plate 7 is pressed by the top portion 11a of the lock releasing key 11. As a consequence, the lock plate 7 is downwardly deformed with a flexibility as shown in FIG. 6 so that the nail portion 9 is disengaged from the engagement aperture 2a of the accommodation portion 2. When the car stereo body 1 is drawn from the accommodation portion 2 under the condition that the nail portion 9 is disengaged from the engagement aperture 2a, the nail portion 9 is moved along the upper inner wall of the accommodation portion 2, whereby the car stereo body 1 can be ejected from the accommodation portion 2.

When the car stereo body 1 is accommodated in the accommodation portion 2 one more time, the car stereo body 1 from which the lock releasing key 11 has been extracted from the lock releasing aperture 10 is inserted into the accommodation portion 2, whereby the lock plate 7 is downwardly deformed with a flexibility because the inclined surface 9a of the nail portion 9 is brought in contact with and pressed by the mouth edge of the opening portion of the accommodation portion 2. As a result, the nail portion 9 is moved along the upper inner wall of the accommodation portion 2 so that, when the nail portion 9 reaches the engagement aperture 2a of the accommodation portion 2, the lock plate 7 is resiliently restored so that the nail portion 9 is pushed upwardly and engaged with the engagement aperture 2a, thereby the car stereo body 1 being secured within the accommodation portion 2. Thereafter, the front panel 13 is attached to the front surface panel frame 5 and the attachment operation is ended.

In the thus arranged detachable apparatus for automotive audio equipment, when the user removes the front panel 13 from the front surface panel frame 5 under the condition that the car stereo body 1 is in use, the car stereo body 1 itself can be made inconspicuous, which can protect the car stereo body 1 from being stolen. Further, the car stereo body 1 having no front panel 13 attached thereon cannot function as a car stereo at all. In addition, the car stereo body 1 cannot be detached from the accommodation portion 2 without the lock releasing key 11 and therefore the car stereo body 1 can be protected from being stolen. Furthermore, since the nail portions 9, 9 of the lock plate 7 are erected from the free end sides of the lock plate 7, the nail portion 9 can be strongly engaged with the engagement aperture 2a of the accommodation portion 2. Therefore, it is impossible to detach the car stereo body 1 from the accommodation portion 2.

The detachable apparatus for automotive equipment thus arranged has a simple structure formed of the lock plate 7 having the nail member 9, one screw 6 that attaches the lock plate 7 to the chassis 4, and the engagement aperture 2a formed in the accommodation portion 2 so as to be engaged with the nail portion 9 of the lock plate 7. Further, the lock plate 7 is attached to the car stereo body 1 in the beginning of the assembly process of the car stereo body 1, and the car stereo body 1 can be detached from the accommodation portion 2 with ease by the lock releasing key 11. Thus, the number of assembly parts of the detachable apparatus can be reduced considerably and the proportion of defective parts can be reduced, which can reduce the manufacturing cost of the apparatus. Also, since the number of assembly parts can be reduced, the product packaging can be simplified. Further, the number of times that the user attaches and detaches the car stereo body 1 to and from the accommodation portion 2 can be reduced and the time required by the user for such work can be reduced.

Figure 8:
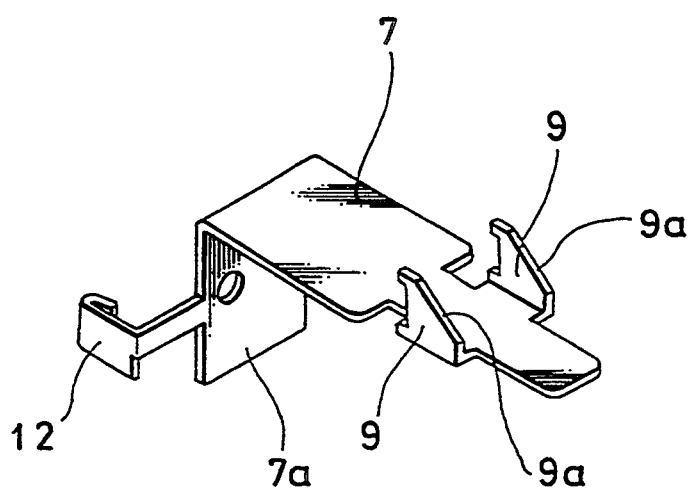
FIG. 8 is a perspective view showing another example of the lock plate according to the embodiment of the present invention.

While the lock plate 7 has the inclined surface 8 with which the lock releasing key 11 comes in contact as described above, the present invention is not limited thereto and the lock plate 7 may be formed as a flat-shaped lock plate having no inclined surface as shown in FIG. 8. In that case, if the top portion of the lock releasing key 11 inserted from the lock releasing aperture 10 is inclined a little downwardly, then the lock plate 7 can be resiliently deformed in the lower direction with ease.

While the car stereo body 1 is accommodated within the accommodation portion 2 that is attached to the dashboard as described above, the present invention is not limited thereto and the car stereo body 1 may be accommodated within an accommodation portion that is directly formed in the dashboard and the engagement aperture that engages with the nail portion of the lock plate may be bored through the wall surface of this accommodation portion.

The present invention is not limited to the above embodiment and various changes and modifications are possible without departing from the gist of the present invention. For example, while the ground circuit on the front panel 13 side is grounded to the chassis 4 by contacting the ground plate 22 attached to the front back panel portion 15 with the rotation preventing member 12 on the car stereo body 1 under a spring force, the ground plate 22 may be omitted and the leg portion 21a of the LCD support member 21 is extended to the rear surface of the back panel portion 15 and this leg portion 21a may be directly brought in contact with the rotation preventing member 12 of the car stereo body 1 under a spring force.

While the rotation preventing member 12 is employed as the contact member as described above, the contact member may not always be molded unitarily with the lock plate. The contact member may be formed independently of the lock plate 7 so long as it is connected to the chassis 4 of the car stereo body 1.

Further, while the lock plate 7 is formed on the upper portion of the car stereo body 1 in the detachable apparatus for automotive equipment, the present invention is not limited thereto and the lock plate 7 may be formed on the lower portion of the car stereo body 1.

Further, the lock plate 7 is incorporated within the car stereo body 1 as described above but the present invention is not limited thereto. Therefore, the lock plate 7 may be formed on the attachment frame 2 and the engagement aperture 2a that engages with the nail portion 9 of the lock plate 7 may be formed on the car stereo body 1. Further, the engagement portion of the lock plate 7 is not limited to the nail portion 9 and may be formed as a protrusion. Furthermore, while the car stereo is described as automotive equipment as described above, the present invention is not limited thereto and may be applied to a wide variety of automotive equipment.

As described above, according to the detachable apparatus for automotive equipment, under the condition that the equipment body is accommodated within the accommodation portion, the engagement portion of the lock member attached to the equipment body is extended through the frame body of the equipment body and engaged with and secured to the engaged portion of the accommodation portion. Further, by the lock releasing key inserted from a lock releasing aperture bored through the front surface panel frame formed on the equipment body, the operation portion is flexed to disengage the engagement portion of the lock member from the engaged portion of the accommodation portion, whereby the equipment body can be detached from the accommodation portion. Therefore, the number of assembly parts of the detachable apparatus can be reduced considerably and the deflective fraction can be reduced. Further, since the number of assembly parts can be reduced, the product packaging can be simplified, which can therefore make the automotive equipment inexpensive. Furthermore, the number of processes and the time of the process in which the user attaches and detaches the equipment body to and from the dashboard of the car can be reduced.

Having described a preferred embodiment of the invention with reference to the accompanying drawings, it is to be understood that the invention is not limited to that precise embodiment and that various changes and modifications can be effected therein by one skilled in the art without departing from the spirit or scope of the invention as defined in the appended claims.

What is claimed is:

1. A detachable apparatus for automotive equipment comprising:
   an equipment body having a frame body and a front surface panel frame;
   an accommodation portion in which said equipment body is accommodated with a substantially precise positioning;
   a lock member formed of an operation portion attached to an inside of said frame body, said operation portion being deformable with resiliency, and an engagement portion projecting to an outside of said frame body and being engaged with an engaged portion formed on an inner wall portion of said accommodation portion;
   a lock releasing aperture bored through said front surface panel frame in association with said operation portion;
   a lock releasing key removably inserted into said lock releasing aperture and urged against said operation portion for moving said lock member in a downward direction and thereby disengaging said engagement portion of said lock member from said engaged portion of said accommodation portion; and
   a front panel removably attached to a front surface of said front surface panel frame, wherein said lock releasing aperture is closed by said front panel under a condition that said front panel is attached to said front surface panel frame.

2. The detachable apparatus for automotive equipment according to claim 1 wherein said operation portion of said lock member comprises an inclined surface, said inclined surface being positioned so as to make contact with said lock releasing key when said lock releasing key is inserted into said lock releasing aperture.

3. A detachable apparatus for automotive equipment comprising:
- an equipment body having a frame body and a front surface panel frame;
- an accommodation portion in which said equipment body is accommodated with a substantially precise positioning;
- a lock member formed of an operation portion attached to an inside of said frame body, said operation portion being deformable with resiliency, and an engagement portion projecting to an outside of said frame body and being engaged with an engaged portion formed on an inner wall portion of said accommodation portion;
- a lock releasing aperture bored through said front surface panel frame in association with said operation portion;
- a lock releasing key removably inserted into said lock releasing aperture and urged against said operation portion for moving said lock member in a downward direction and thereby disengaging said engagement portion of said lock member from said engaged portion of said accommodation portion; and
- a front panel removably attached to a front surface of said front surface panel frame for contact with said equipment body, wherein said front panel includes a front panel portion and a back panel portion, said back panel portion incorporating therein an electronic element, a support member of said electronic element, and a ground terminal which resiliently makes contact with said support member, whereby charges around said electronic element are grounded through said ground terminal to said frame body.

4. The detachable apparatus for automotive equipment according to claim 3 wherein said lock member has a contact portion extending through a front portion of said front surface panel frame and said ground terminal is grounded through contact with said contact portion of said lock member under a condition that said front panel is attached to said front surface panel frame.

* * * * *